United States Patent
Doppalapudi et al.

(10) Patent No.: US 10,700,888 B2
(45) Date of Patent: Jun. 30, 2020

(54) CMOS QUARTER-RATE MULTIPLEXER FOR HIGH-SPEED SERIAL LINKS

(71) Applicant: MACOM Technology Solutions Holdings, Inc., Lowell, MA (US)

(72) Inventors: Naga Rajesh Doppalapudi, Santa Clara, CA (US); Echere Iroaga, Santa Clara, CA (US)

(73) Assignee: MACOM Technology Solutions Holdings, Inc., Lowell, MA (US)

( * ) Notice: Subject to any disclaimer, the term of this patent is extended or adjusted under 35 U.S.C. 154(b) by 0 days.

(21) Appl. No.: 16/055,332

(22) Filed: Aug. 6, 2018

(65) Prior Publication Data

US 2020/0044890 A1   Feb. 6, 2020

(51) Int. Cl.
*H04L 12/40*   (2006.01)
*H04J 3/04*    (2006.01)
*G06F 7/58*    (2006.01)

(52) U.S. Cl.
CPC .......... *H04L 12/4013* (2013.01); *G06F 7/582* (2013.01); *H04J 3/047* (2013.01)

(58) Field of Classification Search
CPC ....... H04L 12/4013; G06F 7/582; H04J 3/047
See application file for complete search history.

(56) References Cited

U.S. PATENT DOCUMENTS

| | | | |
|---|---|---|---|
| 5,162,666 A * | 11/1992 | Tran | H04J 3/047 326/21 |
| 5,625,303 A * | 4/1997 | Jamshidi | H03K 17/693 326/106 |
| 5,896,417 A | 4/1999 | Lau | |
| 5,955,912 A * | 9/1999 | Ko | H03K 17/693 326/113 |
| 6,194,950 B1 * | 2/2001 | Kibar | H03K 17/04106 327/407 |
| 6,356,132 B1 * | 3/2002 | Mastrocola | H03K 5/131 327/269 |
| 6,998,872 B1 * | 2/2006 | Chirania | H03K 19/1736 326/39 |
| 7,075,333 B1 * | 7/2006 | Chaudhary | H03K 19/1737 326/38 |
| 7,738,381 B2 | 6/2010 | Wiggins et al. | |
| 8,693,599 B2 | 4/2014 | Araki et al. | |
| 8,817,855 B2 | 8/2014 | Asmanis et al. | |
| 9,319,348 B2 | 4/2016 | Patel et al. | |

(Continued)

*Primary Examiner* — Christopher P Grey
(74) *Attorney, Agent, or Firm* — Amin, Turocy & Watson, LLP (57) ABSTRACT

Various aspects provide for a multiplexer for high-speed serial links. For example, a system can include a first stage data path multiplexer circuit and a second stage data path multiplexer circuit. The first stage data path multiplexer circuit comprises a first inverter circuit to select a first data signal from a set of data signals and a second inverter circuit to select a second data signal from the set of data signals. The first inverter circuit comprises a first set of inverters and a first set of transmission gates. The second inverter circuit comprises a second set of inverters and a second set of transmission gates. The second stage data path multiplexer circuit is configured as a third inverter circuit to select the first data signal or the second data signal as an output data signal. The third inverter circuit comprises a third set of inverters and a third set of transmission gates.

20 Claims, 8 Drawing Sheets

(56) References Cited

U.S. PATENT DOCUMENTS

| | | |
|---|---|---|
| 9,575,726 B2 | 2/2017 | Rivoir |
| 9,705,504 B1 * | 7/2017 | Ng .................... H03K 19/17728 |
| 9,705,522 B1 | 7/2017 | Ng et al. |
| 10,069,508 B1 * | 9/2018 | Zhang .................... H03M 1/662 |
| 2002/0053938 A1 * | 5/2002 | Tran .................... H03K 19/1737 |
| | | 327/408 |
| 2010/0074095 A1 * | 3/2010 | Jung ................. H04L 25/03343 |
| | | 370/201 |
| 2017/0085361 A1 * | 3/2017 | Hood .................... H03K 5/135 |
| 2017/0168830 A1 * | 6/2017 | Brownscheidle ..... G06F 9/3836 |

* cited by examiner

CMOS QUARTER-RATE MULTIPLEXER FOR HIGH-SPEED SERIAL LINKS

TECHNICAL FIELD

The subject disclosure relates generally to electronic circuits, and more particularly to multiplexer circuitry.

BACKGROUND

A multiplexer is an electronic device that selects a signal from a group of signals (e.g., a group of signals received as input) and outputs the selected signal. In an example, multiplexers can be employed in a transmitter and/or a receiver fabricated via a Complementary Metal-Oxide-Semiconductor (CMOS) process. However, high-speed clock generation and/or high-speed clock distribution is generally difficult to achieve with conventional multiplexers due to increased consumption of power with an increase in operational speeds. As such, conventional multiplexers can be improved.

The above-described description is merely intended to provide a contextual overview of current techniques and is not intended to be exhaustive.

SUMMARY

The following presents a simplified summary in order to provide a basic understanding of some aspects described herein. This summary is not an extensive overview of the disclosed subject matter. It is intended to neither identify key nor critical elements of the disclosure nor delineate the scope thereof. Its sole purpose is to present some concepts in a simplified form as a prelude to the more detailed description that is presented later.

In an example embodiment, a system for improving bandwidth of a multiplexer comprises a first stage data path multiplexer circuit and a second stage data path multiplexer circuit. The first stage data path multiplexer circuit comprises a first inverter circuit configured to select a first data signal from a set of data signals and a second inverter circuit configured to select a second data signal from the set of data signals. The first inverter circuit comprises a first set of inverters and a first set of transmission gates, and wherein the second inverter circuit comprises a second set of inverters and a second set of transmission gates. The second stage data path multiplexer circuit is configured as a third inverter circuit to select the first data signal or the second data signal as an output data signal. The third inverter circuit comprises a third set of inverters and a third set of transmission gates.

In another example embodiment, a method comprises selecting a first data signal from a set of data signals via a first inverter circuit that comprises a first set of inverters and a first set of transmission gates. The method further comprises selecting a second data signal from the set of data signals via a second inverter circuit that comprises a second set of inverters and a second set of transmission gates. The method further comprises selecting the first data signal or the second data signal as an output data signal via a third inverter circuit that comprises a third set of inverters and a third set of transmission gates.

In yet another example embodiment, a system comprises a first multiplexer and a second multiplexer. The first multiplexer is configured to select a subset of data signals from a set of data signals. The second multiplexer is for improving bandwidth associated with the subset of data signals. The second multiplexer comprises a first stage data path multiplexer circuit and a second stage data path multiplexer circuit. The first stage data path multiplexer circuit comprises a first inverter circuit configured to select a first data signal from the subset of data signals and a second inverter circuit configured to select a second data signal from the subset of data signals. The first inverter circuit comprises a first set of inverters and a first set of transmission gates. The second inverter circuit comprises a second set of inverters and a second set of transmission gates. The second stage data path multiplexer circuit comprises a third inverter circuit configured to select the first data signal or the second data signal as an output data signal. The third inverter circuit comprises a third set of inverters and a third set of transmission gates.

The following description and the annexed drawings set forth in detail certain illustrative aspects of the subject disclosure. These aspects are indicative, however, of but a few of the various ways in which the principles of various disclosed aspects can be employed and the disclosure is intended to include all such aspects and their equivalents. Other advantages and novel features will become apparent from the following detailed description when considered in conjunction with the drawings.

DETAILED DESCRIPTION

The disclosure herein is described with reference to the drawings, wherein like reference numerals are used to refer to like elements throughout. In the following description, for purposes of explanation, numerous specific details are set forth in order to provide a thorough understanding of the subject innovation. It may be evident, however, that various disclosed aspects can be practiced without these specific details. In other instances, well-known structures and devices are shown in block diagram form in order to facilitate describing the subject innovation.

The emergence of high-speed mobile connectivity, cloud computing, storage applications, etc. has significantly increased demand for higher data transfer speeds in carrier networks as well as in data centers. To provide the higher data transfer speeds, an optical transceiver can employ PAM-4 and/or Forward Error Correction (FEC) schemes to achieve data rates beyond, for example, 100 Gbps over single-λ of a communication fiber. Alternatively, a coherent transceiver can employ dual polarization and/or higher-order modulation schemes to support, for example, data rates beyond 400 Gbps per Δ. A multiplexer is an electronic device that selects a signal from a group of signals (e.g., a group of signals received as input) and outputs the selected signal. In an example, multiplexers can be employed in a transceiver fabricated via a Complementary Metal-Oxide-Semiconductor (CMOS) process. However, high-speed clock generation and/or high-speed clock distribution is generally difficult to achieve with conventional transceivers and/or conventional multiplexers due to increased consumption of power with an increase in operational speeds.

To address these and/or other issues, one or more embodiments described herein provide an improved multiplexer for high-speed serial links, which offers a number of benefits relative to conventional techniques and/or conventional multiplexers. For instance, a CMOS multiplexer circuit implementation can be provided that can increase operational speeds and/or reduce power. In an embodiment, a CMOS quarter-rate multiplexer for high-speed serial links can be provided. In an aspect, unequally sized transmission gates can be employed by a multiplexer to improve bandwidth of the multiplexer and/or balance jitter on even and odd edges of data output from the multiplexer. In another aspect, an additional inverter and/or an additional transmission gate can be employed for a second stage of the quarter-rate multiplexer. In yet another aspect, input data retiming can be absorbed into a previous multiplexing stage (e.g., a low-speed multiplexing stage). As such, operational speeds of a multiplexer can be improved. Furthermore, consumption of power by a multiplexer can be reduced.

Figure 1:
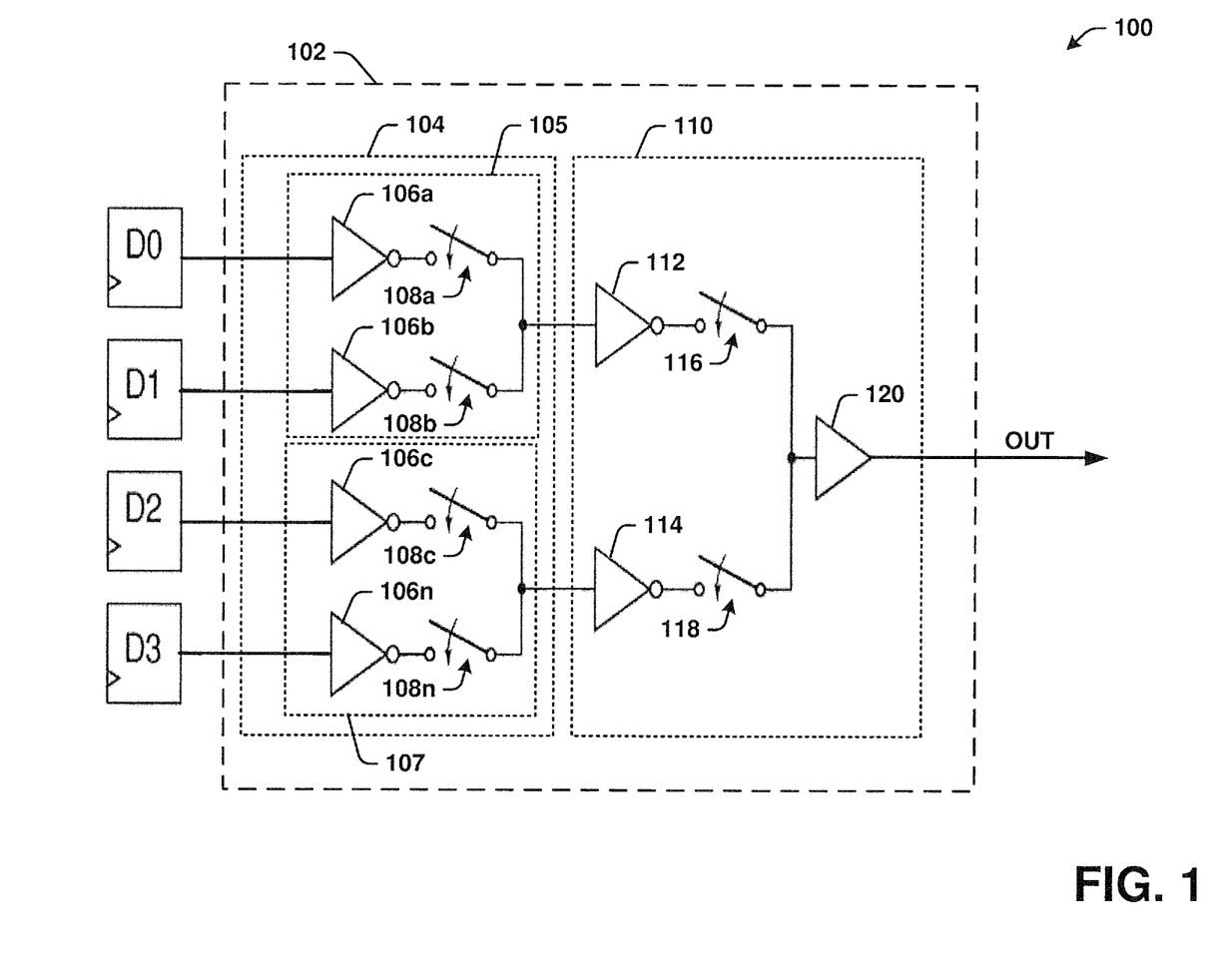
FIG. 1 illustrates an example, non-limiting embodiment of a system in accordance with various aspects described herein.

Turning now to FIG. 1, a block diagram illustrating an example, non-limiting embodiment of a system 100 in accordance with various aspects described herein is shown. The system 100 can be a multiplexer circuit system. For example, the system 100 can be a CMOS multiplexer system. In a non-limiting example, the system 100 can be a CMOS quarter-rate multiplexer system. In an aspect, the system 100 can provide increased operational speeds and/or can provide a reduction in power as compared to conventional multiplexer systems.

The system 100 can include a multiplexer circuit 102. The multiplexer circuit 102 can receive a set of data signals D0-D3. For example, the multiplexer circuit 102 can receive a data signal D0, a data signal D1, a data signal D2, and a data signal D3. The set of data signals D0-D3 can be, for example, a set of data streams with a defined number of bits. In an embodiment, the set of data signals D0-D3 can be a set of pseudo-random binary sequence data streams. For example, the set of data signals D0-D3 can be single-bit data streams at a particular data rate (e.g., 14 GHz for a 56 Gbps transmitter, etc.). However, it is to be appreciated that the set of data signals D0-D3 can be formatted as different types of data streams. The multiplexer circuit 102 can include a first stage data path multiplexer circuit 104 and a second stage data path multiplexer circuit 110. The first stage data path multiplexer circuit 104 can include a first inverter circuit 105 and a second inverter circuit 107. The first inverter circuit 105 can select a first data signal from the set of data signals D0-D3. Furthermore, the second inverter circuit can select a second data signal from the set of data signals D0-D3. In an aspect, the first inverter circuit 105 can include a first set of inverters 106a-b and a first set of transmission gates 108a-b. For instance, the first inverter circuit 105 can include an inverter 106a, an inverter 106b, a transmission gate 108a and a transmission gate 108b. Furthermore, the second inverter circuit 107 can include second set of inverters 106c-n and a second set of transmission gates 108c-n. For instance, the second inverter circuit 107 can include an inverter 106c, an inverter 106n, a transmission gate 108c and a transmission gate 108n. The inverters 106a-n can be configured to perform logical negation with respect to a data signal from the set of data signals D0-D3. For instance, the inverters 106a-n can be configured as NOT logic gates that generate inverted versions of the set of data signals D0-D3. In one example, the inverter 106a can generate an inverted version of the data signal D0, the inverter 106b can generate an inverted version of the data signal D1, the inverter 106c can generate an inverted version of the data signal D2, and the inverter 106n can generate an inverted version of the data signal D3. The set of transmission gates 108a-n can be configured to open or close based on a control signal (e.g., a clock signal). For instance, the set of transmission gates 108a-n can be a set of analog switches that pass or block a data signal from the set of data signals D0-D3. In one example, the transmission gate 108a can be configured to open or close to facilitate passing or blocking the data signal D0, the transmission gate 108b can be configured to open or close to facilitate passing or blocking the data signal D1, the transmission gate 108c can be configured to open or close to facilitate passing or blocking the data signal D2, and the transmission gate 108n can be configured to open or close to facilitate passing or blocking the data signal D3. In a non-limiting example, the multiplexer circuit 102 (e.g., the multiplexer circuit 102 that includes the first stage data path multiplexer circuit 104 and the second stage data path multiplexer circuit 110) can correspond to a 4:1 multiplexer. In certain embodiments, the multiplexer circuit 102 (e.g., the first stage data path multiplexer circuit 104 and/or the second stage data path multiplexer circuit 110 of the multiplexer circuit 102) can receive the set of data signals D0-D3 from an 8:4 multiplexer.

The second stage data path multiplexer circuit 110 can be a third inverter circuit. The second stage data path multiplexer circuit 110 (e.g., the third inverter circuit) can select the first data signal or the second data signal as an output data signal (e.g., OUT shown in FIG. 1). In one example, the output data signal can be a data stream at 10 Gb/s. However, it is to be appreciated that the output data signal can be a different type of data signal. In an aspect, the second stage data path multiplexer circuit 110 (e.g., the third inverter circuit) can include an inverter 112 and an inverter 114 (e.g., a third set of inverters). Furthermore, second stage data path multiplexer circuit 110 (e.g., the third inverter circuit) can include a transmission gate 116 and a transmission gate 118 (e.g., a third set of transmission gates). In certain embodiments, the second stage data path multiplexer circuit 110 can include an amplifier 120. The amplifier 120 can, for example, amplify and/or output the output data signal. In another aspect, the inverter 112 can receive the first data signal selected by the first inverter circuit 105 and the inverter 114 can receive the second data signal selected by the second inverter circuit 107. The inverter 112 can be configured to perform logical negation with respect to a data signal (e.g., an inverted version of the data signal D0 or the data signal D1) received from the first inverter circuit 105. Additionally, the inverter 114 can be configured to perform logical negation with respect to a data signal (e.g., an inverted version of the data signal D2 or the data signal D3) received from the second inverter circuit 107. For instance, the inverter 112 can be configured as NOT logic gate that inverts an inverted version of the data signal D0 or the data signal D1 to provide an original version of the data signal D0 or the data signal D1. Furthermore, the inverter 114 can be configured as NOT logic gate that inverts an inverted version of the data signal D2 or the data signal D3 to provide an original version of the data signal D2 or the data signal D3. The transmission gate 116 can be configured to open or close based on a control signal (e.g., a clock signal). For instance, the transmission gate 116 can be an analog switch that passes or blocks the data signal D0 or the data signal D1. Furthermore, the transmission gate 118 can also be configured to open or close based on a control signal (e.g., a clock signal). For instance, the transmission gate 118 can be an analog switch that passes or blocks the data signal D2 or the data signal D3

In an embodiment, the first set of transmission gates 108a-b (e.g., the transmission gate 108a and the transmission gate 108b) can be electrically coupled to the first set of inverters 106a-b (e.g., the inverter 106a and the inverter 106b). Additionally, the first set of transmission gates 108a-b (e.g., the transmission gate 108a and the transmission gate 108b) can be electrically coupled to the inverter 112 from the second stage data path multiplexer circuit 110 (e.g., the third inverter circuit). For example, the transmission gate 108a can be electrically coupled to the inverter 106a of the first stage data path multiplexer circuit 104, the transmission gate 108b of the first stage data path multiplexer circuit 104, and the inverter 112 of the second stage data path multiplexer circuit 110. Furthermore, the transmission gate 108b can be electrically coupled to the inverter 106b of the first stage data path multiplexer circuit 104, the transmission gate 108a of the first stage data path multiplexer circuit 104, and the inverter 112 of the second stage data path multiplexer circuit 110. The second set of transmission gates 108c-n (e.g., the transmission gate 108c and the transmission gate 108n) can be electrically coupled to the second set of inverters 106c-n (e.g., the inverter 106c and the inverter 106n). Additionally, the second set of transmission gates 108c-n (e.g., the transmission gate 108c and the transmission gate 108n) can be electrically coupled to the inverter 114 from the second stage data path multiplexer circuit 110 (e.g., the third inverter circuit). For example, the transmission gate 108c can be electrically coupled to the inverter 106c of the first stage data path multiplexer circuit 104, the transmission gate 108n of the first stage data path multiplexer circuit 104, and the inverter 114 of the second stage data path multiplexer circuit 110. Furthermore, the transmission gate 108n can be electrically coupled to the inverter 106n of the first stage data path multiplexer circuit 104, the transmission gate 108c of the first stage data path multiplexer circuit 104, and the inverter 114 of the second stage data path multiplexer circuit 110. In another embodiment, the transmission gate 116 and the transmission gate 118 (e.g., the third set of transmission gates) can be electrically coupled to the inverter 112 and the inverter 114, respectively. For example, the transmission gate 116 can be electrically coupled to the inverter 112 and/or the amplifier 120. Furthermore, the transmission gate 118 can be electrically coupled to the inverter 114 and/or the amplifier 120.

In an aspect, a number of inverters included in the first set of inverters 106a-b (e.g., the inverter 106a and the inverter 106b) and the second set of inverters 106c-n (e.g., the inverter 106c and the inverter 106n) can correspond to a number of data signals included in the set of data signals D0-D3. For instance, in the embodiment shown in FIG. 1, the first stage data path multiplexer circuit 104 can receive four data signals D0-D3 and can include four inverters (e.g., the inverter 106a, the inverter 106b, the inverter 106c and the inverter 106n). Additionally, a number of transmission gates included in the first set of transmission gates 108a-b (e.g., the transmission gate 108a and the transmission gate 108b) and the second set of transmission gates 108c-n (e.g., the transmission gate 108c and the transmission gate 108n) can correspond to a number of data signals included in the set of data signals D0-D3. For instance, in the embodiment shown in FIG. 1, the first stage data path multiplexer circuit 104 can receive four data signals D0-D3 and can include four transmission gates (e.g., the transmission gate 108a, the transmission gate 108b, the transmission gate 108c and the transmission gate 108n). In certain embodiments, the first set of transmission gates 108a-b (e.g., the transmission gate 108a and the transmission gate 108b) and the second set of transmission gates 108c-n (e.g., the transmission gate 108c and the transmission gate 108n) can be controlled by a first clock signal and the third set of transmission gates (e.g., the transmission gate 116 and the transmission gate 118) can be controlled by a second clock signal. For example, the first set of transmission gates 108a-b (e.g., the transmission gate 108a and the transmission gate 108b) and the second set of transmission gates 108c-n (e.g., the transmission gate 108c and the transmission gate 108n) can be controlled by a first quarter rate clock signal (e.g., CK4_0). Additionally, the third set of transmission gates (e.g., the transmission gate 116 and the transmission gate 118) can be controlled by a second quarter rate clock signal (e.g., CK4_90). In an aspect, sizing of the third set of transmission gates (e.g., the transmission gate 116 and the transmission gate 118) can be different than sizing of the first set of transmission gates 108a-b (e.g., the transmission gate 108a and the transmission gate 108b) and the second set of transmission gates 108c-n (e.g., the transmission gate 108c and the transmission gate 108n). In another aspect, the inverter 112, the inverter 114, the transmission gate 116 and/or the transmission gate 118 implemented after the first stage data path multiplexer circuit 104 can provide improved operational speeds for the multiplexer circuit 102 and/or a reduction in consumption of power by the multiplexer circuit 102. Moreover, a size of the transmission gate 108a can be different than a size of the transmission gate 108b, a size of the transmission gate 108c can be different than a size of the transmission gate 108n, etc. to further improve speed and/or performance.

Figure 2:
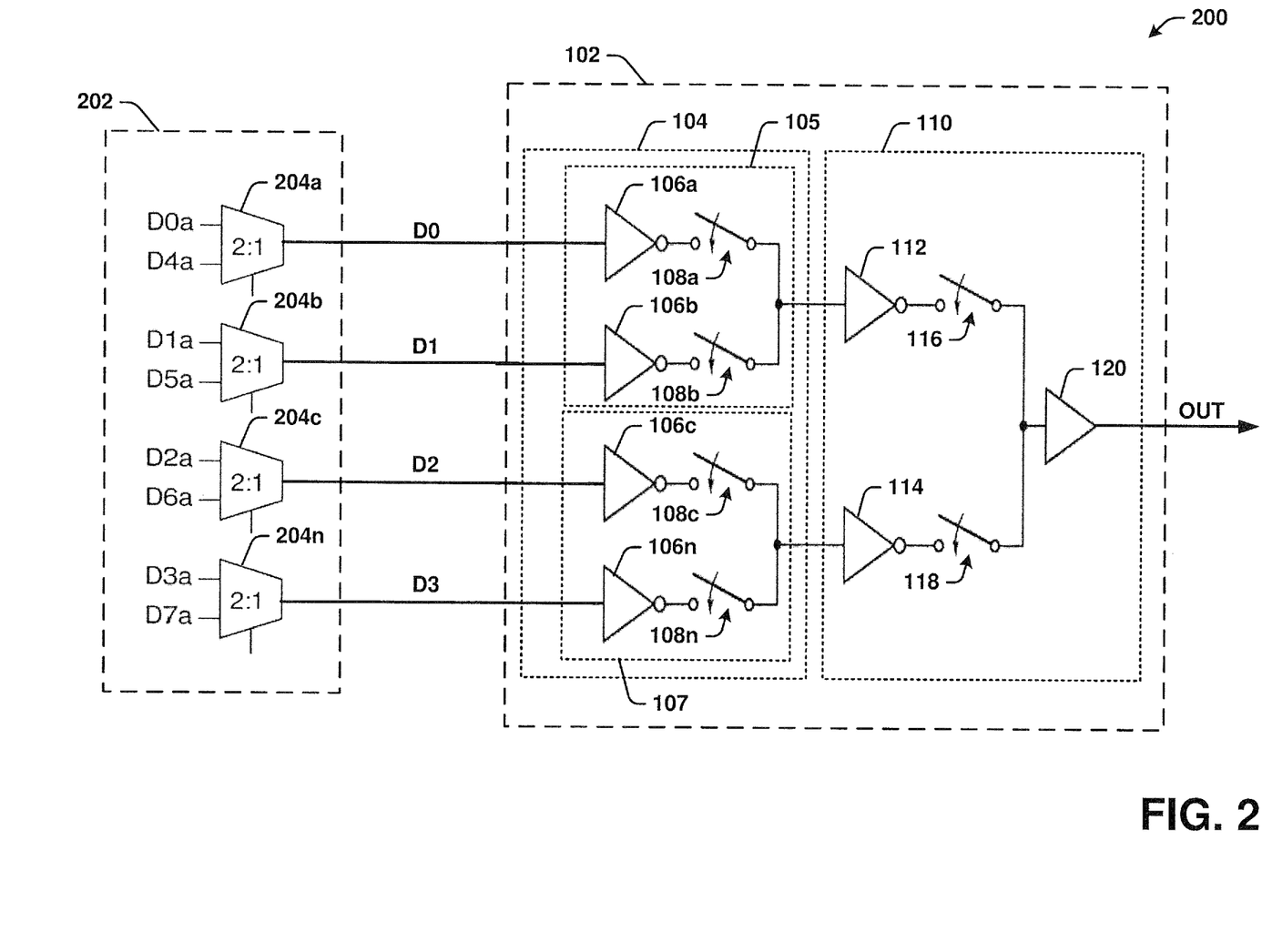
FIG. 2 illustrates another example, non-limiting embodiment of a system in accordance with various aspects described herein.

Referring now to FIG. 2, a block diagram illustrating an example, non-limiting embodiment of a system 200 in accordance with various aspects described herein is shown. The system 200 includes the multiplexer circuit 102 and a multiplexer circuit 202. The multiplexer circuit 102 can include the first stage data path multiplexer circuit 104 and the second stage data path multiplexer circuit 110. The first stage data path multiplexer circuit 104 can include the first inverter circuit 105 and the second inverter circuit 107. The first inverter circuit 105 can include the first set of inverters 106a-b and the first set of transmission gates 108a-b. The second inverter circuit 107 can include the second set of inverters 106c-n and the second set of transmission gates 108c-n. The second stage data path multiplexer circuit 110 can include the inverter 112, the inverter 114, the transmission gate 116, the transmission gate 118 and/or the amplifier 120.

The multiplexer circuit 202 can be configured for retiming. In an embodiment, the multiplexer circuit 202 can include a set of multiplexers 204a-n. For example, the multiplexer circuit 202 can include a multiplexer 204a, a multiplexer 204b, a multiplexer 204c, and a multiplexer 204n. In one example, the multiplexer 204a can be a first 2:1 multiplexer, the multiplexer 204b can be a second 2:1 multiplexer, the multiplexer 204c can be a third 2:1 multiplexer, and the multiplexer 204n can be a fourth 2:1 multiplexer to implement the multiplexer circuit 202 as an 8:4 multiplexer. In an embodiment, the multiplexer 204a can receive a data signal D0a and a data signal D4a. Furthermore, the multiplexer 204a can output the data signal D0 based on the data signal D0a and the data signal D4a. The multiplexer 204b can receive a data signal D1a and a data signal D5a. Furthermore, the multiplexer 204b can output the data signal D1 based on the data signal D1a and the data signal D5a. The multiplexer 204c can receive a data signal D2a and a data signal D6a. Furthermore, the multiplexer 204c can output the data signal D2 based on the data signal D2a and the data signal D6a. The multiplexer 204n can receive a data signal D3a and a data signal D7a. Furthermore, the multiplexer 204n can output the data signal D3 based on the data signal D3a and the data signal D7a. In an aspect, the inverter 106a can receive the data signal D0 provided by the multiplexer 204a, the inverter 106b can receive the data signal D1 provided by the multiplexer 204b, the inverter 106c can receive the data signal D2 provided by the multiplexer 204c, and the inverter 106n can receive the data signal D3 provided by the multiplexer 204n. In certain embodiments, the multiplexer 204a, the multiplexer 204b, the multiplexer 204c and/or the multiplexer 204n can include a set of latches configured to produce the data signal D0, the data signal D1, the data signal D2 and/or the data signal D3. The data signal D0a, the data signal D4a, the data signal D1a, the data signal D5a, the data signal D2a, the data signal D6a, the data signal D3a, and/or the data signal D7a a data stream with a defined number of bits. In an embodiment, the data signal D0a, the data signal D4a, the data signal D1a, the data signal D5a, the data signal D2a, the data signal D6a, the data signal D3a, and/or the data signal D7a can be a set of pseudo-random binary sequence data stream. In an aspect, a data rate of the data signal D0a, the data signal D4a, the data signal D1a, the data signal D5a, the data signal D2a, the data signal D6a, the data signal D3a, and/or the data signal D7a ca be different than a data rate of the data signal D0, the data signal D1, the data signal D2 and/or the data signal D3.

Figure 3:
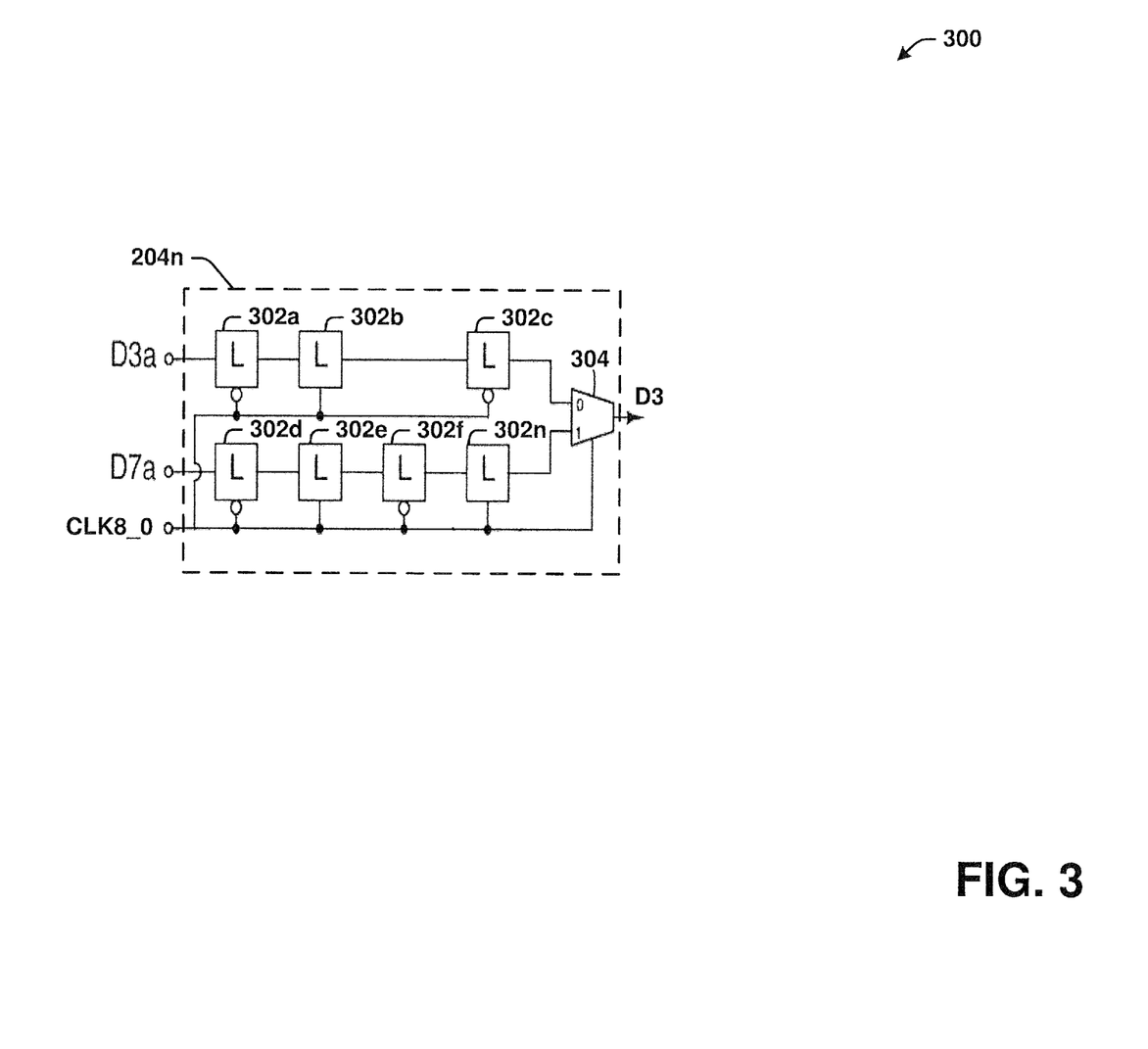
FIG. 3 illustrates yet another example, non-limiting embodiment of a system in accordance with various aspects described herein.

Referring now to FIG. 3, a block diagram illustrating an example, non-limiting embodiment of a system 300 in accordance with various aspects described herein is shown. The system 300 includes the multiplexer 204n. However, it is to be appreciated that the multiplexer 204a, the multiplexer 204b and/or the multiplexer 204c can additionally or alternatively be configured in a similar manner. The multiplexer 204n can include a set of latches 302a-n. For example, a latch 302a can receive the data signal D3a. The latch 302a can be communicatively coupled to a latch 302b, a latch 302c, a latch 302d, a latch 302e, a latch 302f and a latch 302n. The latch 302d can receive the data signal D7a. Output from the latch 302c and the latch 302n can be received by a multiplexer 304. The multiplexer 304 can be, for example, a 2×1 multiplexer that outputs the data signal D3 based on the output from the latch 302c and the latch 302n. The set of latches 302a-n can be a set of electronic logic circuits configured to store one bit of data. In an aspect, the set of latches 302a-n can be configured to produce the data signal D3. In another aspect, the set of latches 302a-n can be controlled by a clock signal (e.g., clock signal CLK8_0). In an embodiment, the latch 302c and the latch 302n that provide output to the multiplexer 304 can be latches at a corresponding frequency. In another aspect, the set of latches 302a-n can provide input data retiming associated with a low-speed multiplexing stage as compared to the multiplexer circuit 102.

Figure 4:
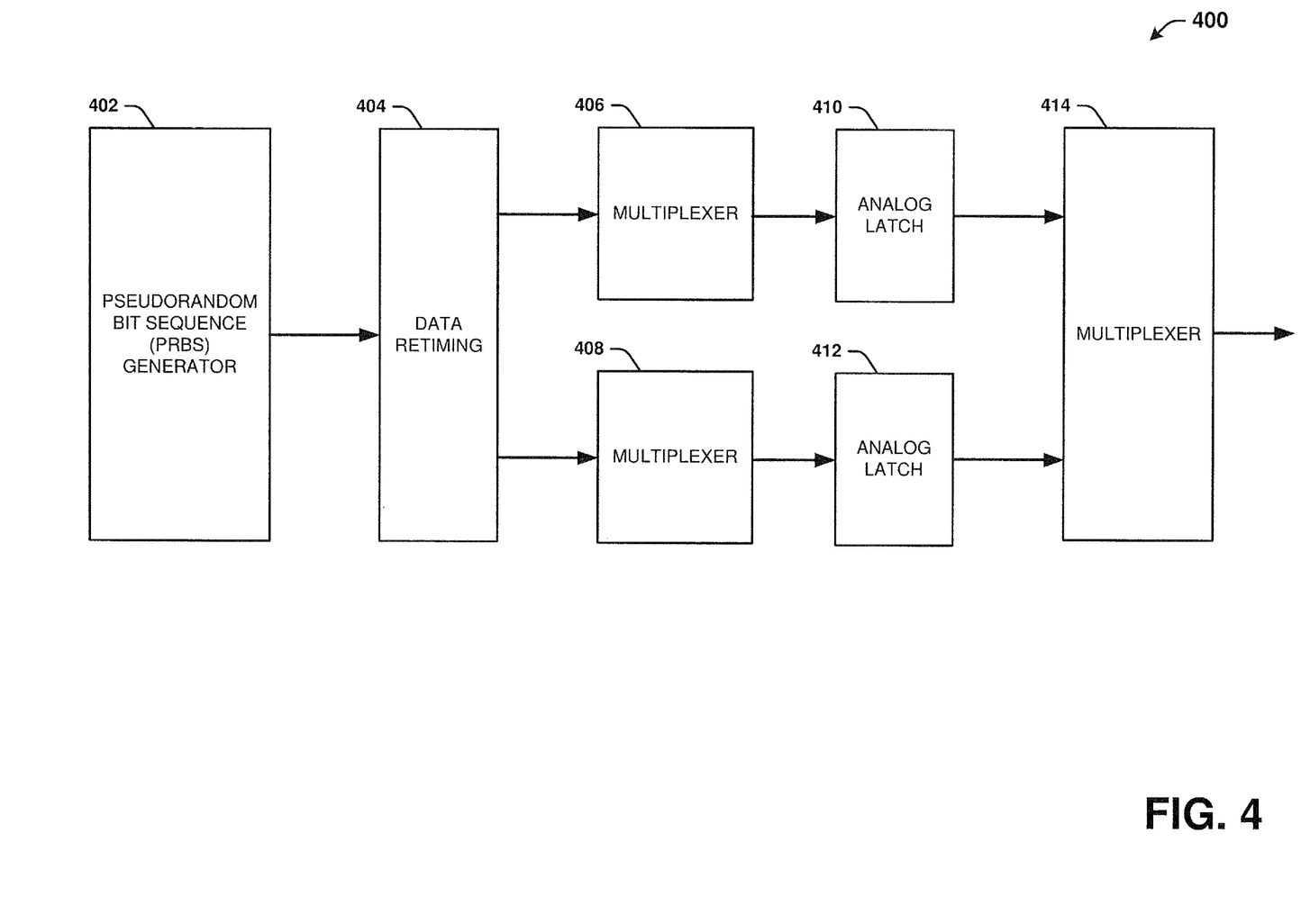
FIG. 4 is a block diagram illustrating an example, non-limiting embodiment of a system in accordance with various aspects described herein.

Referring now to FIG. 4, a block diagram illustrating an example, non-limiting embodiment of a system 400 in accordance with various aspects described herein is shown. The system 400 can be, for example, a non-limiting transmitter architecture that implements a multiplexer as disclosed herein. The system 400 can include a pseudorandom bit sequence (PRBS) generator 402, data retiming 404, a multiplexer 406, a multiplexer 408, an analog latch 410, an analog latch 412 and/or a multiplexer 414. The PRBS generator 402 can generate a data stream at a particular frequency. For example, the PRBS generator 402 can generate an eight-bit data stream at 2.5 GHz. The data retiming 404 can retime the data stream generated by the PRBS generator 402. Furthermore, the data retiming 404 can transmit a retimed version of the data stream to the multiplexer 406 and the multiplexer 408. The multiplexer 406 and the multiplexer 408 can be a 4×1 multiplexer. For example, the multiplexer 406 can correspond to the multiplexer circuit 102. Additionally or alternatively, the multiplexer 408 can correspond to the multiplexer circuit 102. The multiplexer 406 can generate a first data stream and the multiplexer 408 can generate a second data stream. For example, the multiplexer 406 can generate a first 10 GHz data stream and the multiplexer 408 can generate a second 10 GHz data stream. The first data stream generated by the multiplexer 406 can be provided to the analog latch 410 and the second data stream generated by the multiplexer 408 can be provided to the analog latch 412. The analog latch 410 can be, for example, a sample and hold circuit that samples voltage of the first data signal and holds the voltage at a particular voltage level for a certain period of time. Furthermore, the analog latch 412 can be, for example, a sample and hold circuit that samples voltage of the second data signal and holds the voltage at a particular voltage level for a certain period of time. The multiplexer 414 can be, for example, a 2×1 multiplexer that multiplexes the first data signal and the second data signal into a third data signal. The third data signal can have a higher frequency than the first data signal and the second data signal. For example, the third data signal can be a 20 Gb/s data signal. In an embodiment, the third data signal can be transmitted via a communication channel.

Figure 5:
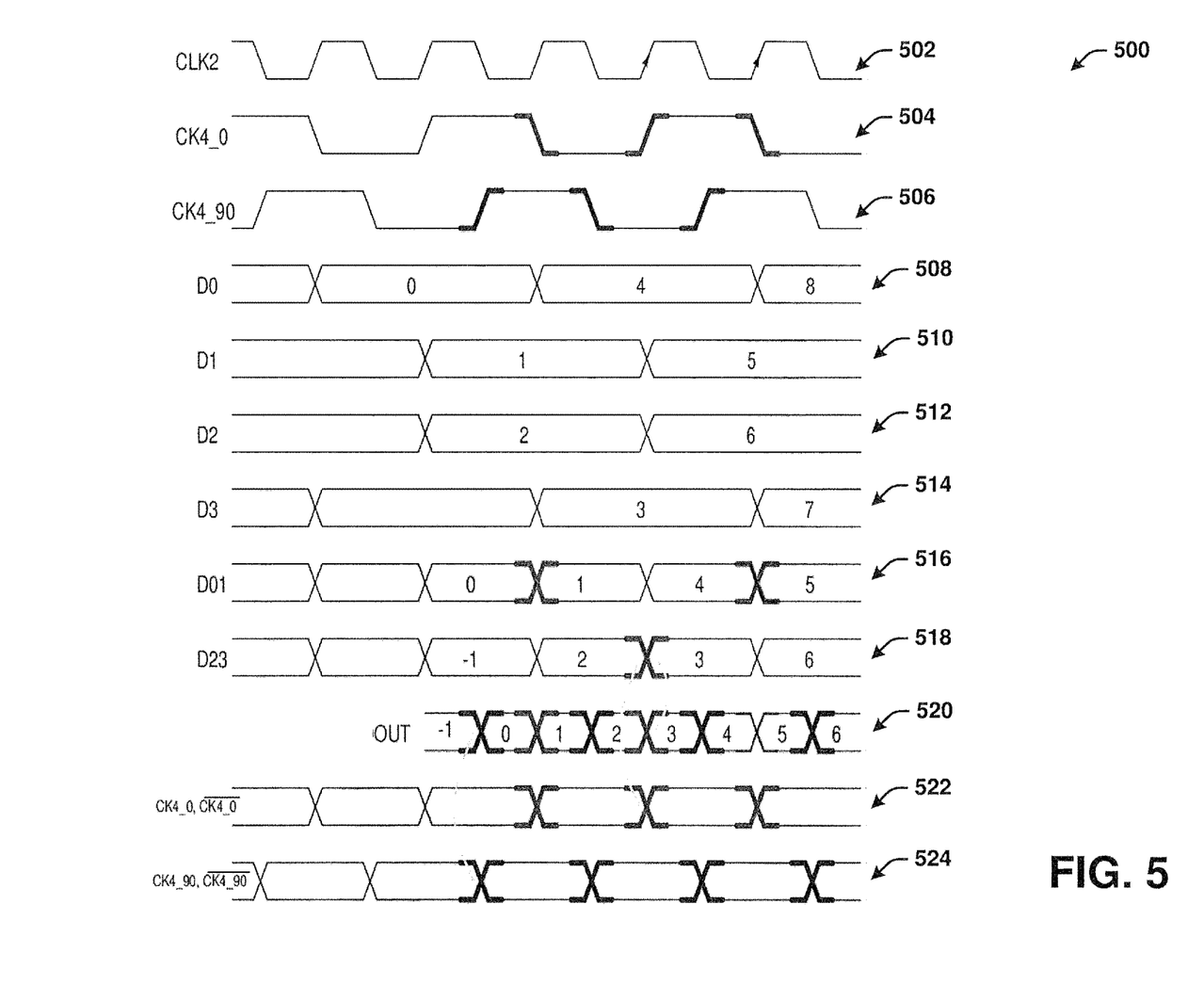
FIG. 5 illustrates an example, non-limiting embodiment of a timing diagram in accordance with various aspects described herein.

Referring now to FIG. 5, a block diagram illustrating an example, non-limiting embodiment of a timing diagram 500 in accordance with various aspects described herein is shown. The timing diagram 500 includes timing data 502 for a clock signal CLK2. The clock signal CLK2 can be, for example, a clock signal that controls a multiplexer (e.g., the multiplexer 204a, the multiplexer 204b, the multiplexer 204c and/or the multiplexer 204n) included in the multiplexer 204. The timing diagram 500 also includes timing data 504 for a clock signal CK4_0 and timing data 506 for a clock signal CK4_90. The clock signal CK4_0 can be, for example, a clock signal that controls the first set of transmission gates 108a-b (e.g., the transmission gate 108a and the transmission gate 108b) and the second set of transmission gates 108c-n (e.g., the transmission gate 108c and the transmission gate 108n). The clock signal CK4_90 can be, for example, a clock signal that controls the third set of transmission gates (e.g., the transmission gate 116 and the transmission gate 118). In an aspect, the clock signal CK4_0 and the clock signal CK4_90 can be quadrature divide-by-4 clock signals. Furthermore, the timing diagram 500 includes timing data 508 for the data signal D0, timing data 510 for the data signal D1, timing data 512 for the data signal D2, and timing data 514 for the data signal D3. The timing diagram 500 also includes timing data 516 for a data signal D01 that corresponds to an inverted version of the data signal D0 or the data signal D1 provided to the inverter 112. The timing diagram 500 also includes timing data 518 for a data signal D23 that corresponds to an inverted version of the data signal D2 or the data signal D3 provided to the inverter 114. The timing diagram 500 also includes timing data 520 for the output data signal (e.g., OUT) provided as output by the second stage data path multiplexer circuit 110. Moreover, the timing diagram 500 also includes other timing data 522 for the clock signal CK4_0 and other timing data 524 for the clock signal CK4_90. In an aspect, the timing data 508 for the data signal D0, the timing data 510 for the data signal D1, the timing data 512 for the data signal D2, and/or the timing data 514 for the data signal D3 can change on a falling edge of the clock signal CK4_0.

Figure 6:
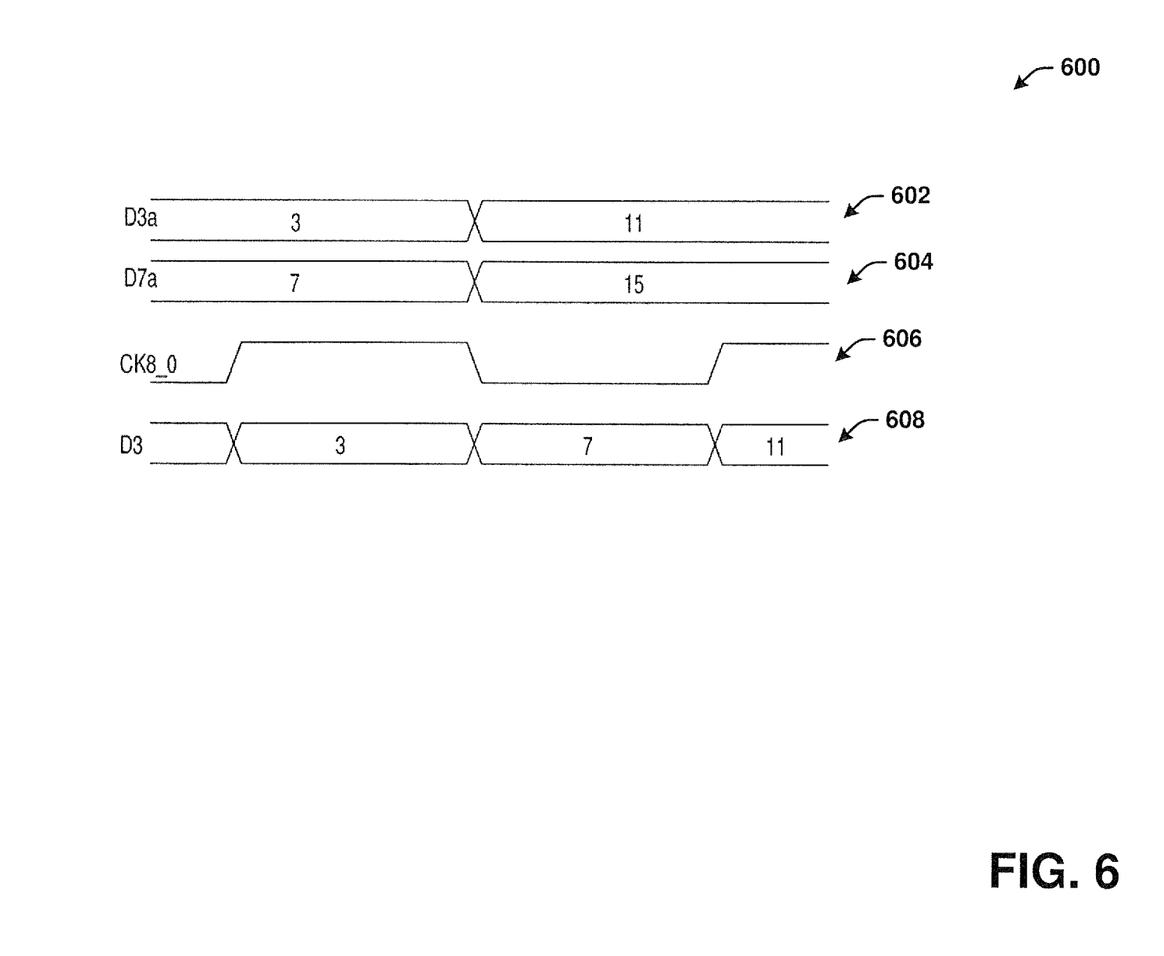
FIG. 6 illustrates another example, non-limiting embodiment of a timing diagram in accordance with various aspects described herein.

Referring now to FIG. 6, a block diagram illustrating an example, non-limiting embodiment of a timing diagram 600 in accordance with various aspects described herein is shown. The timing diagram 600 includes timing data 602 for the data signal D3a and timing data 604 for the data signal D7a. The timing diagram 600 includes timing data 606 for the clock signal CK8_0 that controls the set of latches 302a-n. Furthermore, the timing diagram 600 includes timing data 608 for the data signal D3.

In certain embodiments, aspects of the systems, apparatuses or processes explained in this disclosure (e.g., aspects of the multiplexer circuit 102, the multiplexer circuit 202, the PRBS generator 402, the data retiming 404, the multiplexer 406, the multiplexer 408, the analog latch 410, the analog latch 412 and/or the multiplexer 414) can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. For example, a system can include a memory for storing computer executable components and instructions. Furthermore, the system can include a processor to facilitate operation of the instructions (e.g., computer executable components and instructions) by the system.

Figure 7:
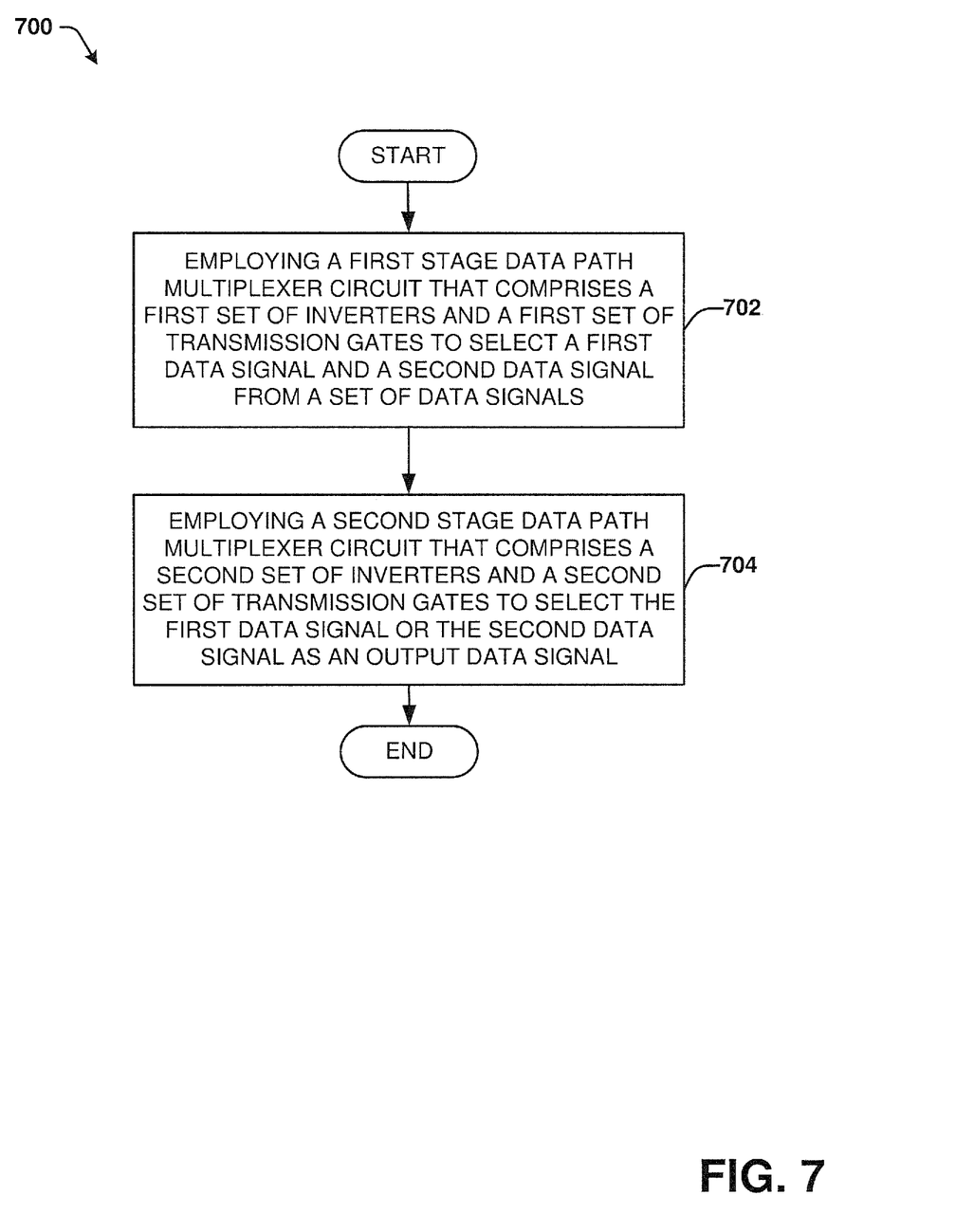
FIG. 7 illustrates a flow diagram of an example, non-limiting embodiment of a method for multiplexing data.
Figure 8:
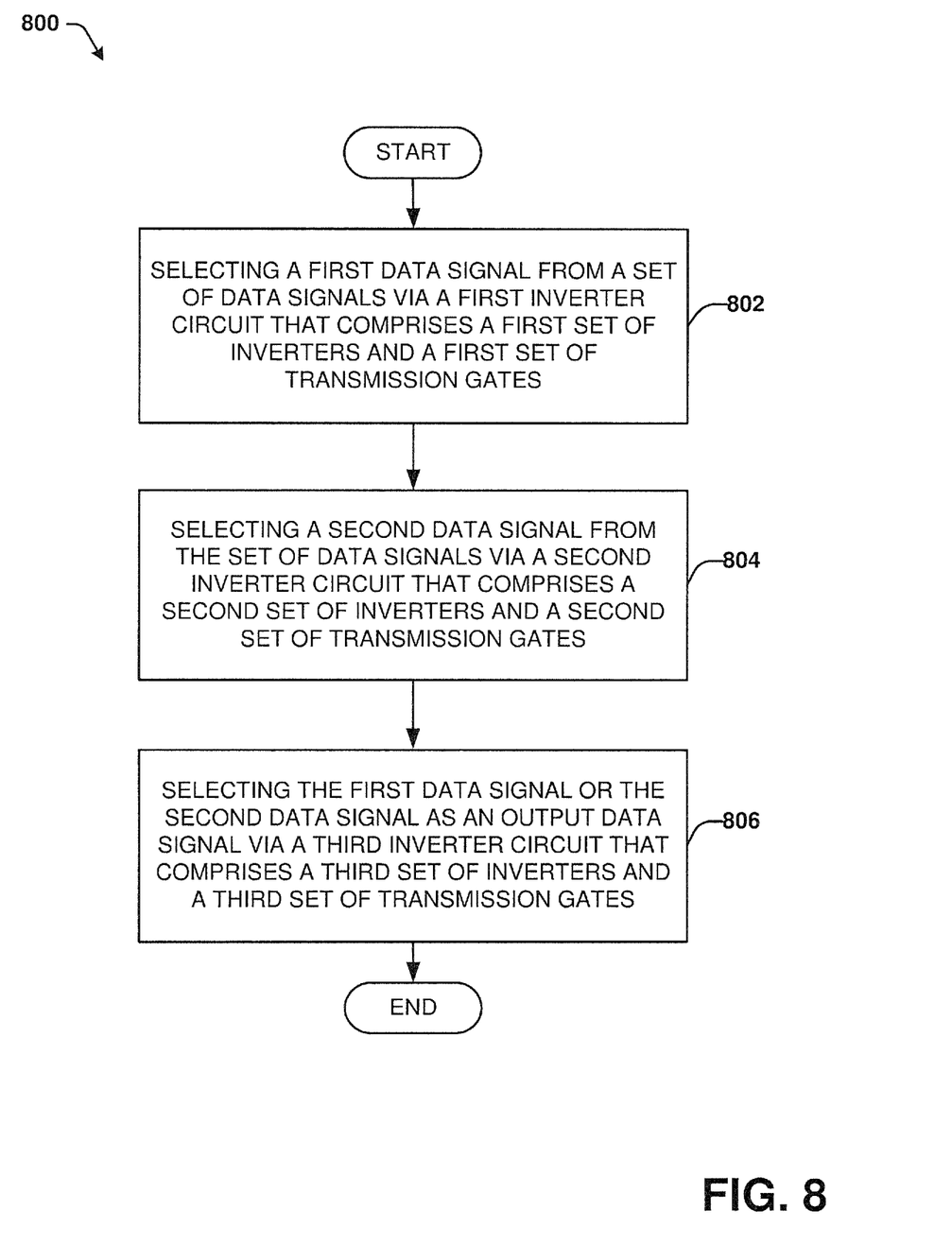
FIG. 8 illustrates a flow diagram of another example, non-limiting embodiment of a method for multiplexing data.

In view of the example systems described above, methods that may be implemented in accordance with the described subject matter may be better appreciated with reference to the flow charts of FIGS. 7-8. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

Referring to FIG. 7, a flow diagram of an example, non-limiting embodiment of a method 700 for multiplexing data is shown. Method 700 can begin at block 702, where a first stage data path multiplexer circuit that comprises a first set of inverters and a first set of transmission gates is employed to select a first data signal and a second data signal from a set of data signals. In an aspect, a number of inverters included in the first set of inverters correspond to a number of data signals included in the set of data signals. In another aspect, a number of transmission gates included in the first set of transmission gates correspond to a number of data signals included in the set of data signals. At block 704, a second stage data path multiplexer circuit that comprises a second set of inverters and a second set of transmission gates is employed to select the first data signal or the second data signal as an output data signal. In an aspect, sizing of the second set of transmission gates can be different than sizing of the first set of transmission gates. In another aspect, the first set of transmission gates can be controlled by a first clock signal and the second set of transmission gates can be controlled by a second clock signal.

Referring to FIG. 8, a flow diagram of another example, non-limiting embodiment of a method 800 for multiplexing data is shown. Method 800 can begin at block 802, a first data signal from a set of data signals is selected via a first inverter circuit that comprises a first set of inverters and a first set of transmission gates. At block 804, a second data signal from the set of data signals is selected via a second inverter circuit that comprises a second set of inverters and a second set of transmission gates. In an aspect, a number of inverters included in the first set of inverters and the second set of inverters can correspond to a number of data signals included in the set of data signals. In another aspect, a number of transmission gates included in the first set of transmission gates and the second set of transmission gates can correspond to a number of data signals included in the set of data signals. At block 806, the first data signal or the second data signal is selected as an output data signal via a third inverter circuit that comprises a third set of inverters and a third set of transmission gates. In an aspect, the first set of transmission gates can be electrically coupled to the first set of inverters and a first inverter from the third set of inverters. Furthermore, the second set of transmission gates can be electrically coupled to the second set of inverters and a second inverter from the third set of inverters. In another aspect, a first inverter from the third set of inverters can be configured to receive the first data signal and a second inverter from the third set of inverters can be configured to receive the second data signal. In yet another aspect, the first set of transmission gates and the second set of transmission gates can be controlled by a first clock signal. Furthermore, the third set of transmission gates can be controlled by a second clock signal.

In certain embodiments, the method 800 can include controlling the first set of transmission gates and the second set of transmission gates via a first clock signal. Additionally or alternatively, the method 800 can include controlling the third set of transmission gates via a second clock signal. In certain embodiments, the method 800 can include transmitting the first data signal to a first inverter from the third set of inverters. Additionally or alternatively, the method 800 can include transmitting the second data signal to a second inverter from the third set of inverters. In certain embodiments, the method 800 can include amplifying the output data signal via an amplifier electrically coupled to the third set of transmission gates. In certain embodiments, the method 800 can include receiving the set of data signals from a multiplexer circuit configured for data retiming.

Although not required, some aspects of the disclosed subject matter can partly be implemented via an operating system, for use by a developer of services for a device or object, and/or included within application software that operates in connection with the component(s) of the disclosed subject matter. Software may be described in the general context of computer executable instructions, such as program modules or components, being executed by one or more computer(s), such as projection display devices, viewing devices, or other devices. Those skilled in the art will appreciate that the disclosed subject matter may be practiced with other computer system configurations and protocols.

Reference throughout this specification to "one embodiment," "an embodiment," "an example," "a disclosed aspect," or "an aspect" means that a particular feature, structure, or characteristic described in connection with the embodiment or aspect is included in at least one embodiment or aspect of the present disclosure. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in various disclosed embodiments.

As utilized herein, terms "component," "system," "engine," "architecture" and the like are intended to refer to a computer or electronic-related entity, either hardware, a combination of hardware and software, software (e.g., in execution), or firmware. For example, a component can be one or more transistors, a memory cell, an arrangement of transistors or memory cells, a gate array, a programmable gate array, an application specific integrated circuit, a controller, a processor, a process running on the processor, an object, executable, program or application accessing or interfacing with semiconductor memory, a computer, or the like, or a suitable combination thereof. The component can include erasable programming (e.g., process instructions at least in part stored in erasable memory) or hard programming (e.g., process instructions burned into non-erasable memory at manufacture).

By way of illustration, both a process executed from memory and the processor can be a component. As another example, an architecture can include an arrangement of electronic hardware (e.g., parallel or serial transistors), processing instructions and a processor, which implement the processing instructions in a manner suitable to the arrangement of electronic hardware. In addition, an architecture can include a single component (e.g., a transistor, a gate array, . . . ) or an arrangement of components (e.g., a series or parallel arrangement of transistors, a gate array connected with program circuitry, power leads, electrical ground, input signal lines and output signal lines, and so on). A system can include one or more components as well as one or more architectures. One example system can include a switching block architecture comprising crossed input/output lines and pass gate transistors, as well as power source(s), signal generator(s), communication bus(ses), controllers, I/O interface, address registers, and so on. It is to be appreciated that some overlap in definitions is anticipated, and an architecture or a system can be a stand-alone component, or a component of another architecture, system, etc.

In addition to the foregoing, the disclosed subject matter can be implemented as a method, apparatus, or article of manufacture using typical manufacturing, programming or engineering techniques to produce hardware, firmware, software, or any suitable combination thereof to control an electronic device to implement the disclosed subject matter. The terms "apparatus" and "article of manufacture" where used herein are intended to encompass an electronic device, a semiconductor device, a computer, or a computer program accessible from any computer-readable device, carrier, or media. Computer-readable media can include hardware media, or software media. In addition, the media can include non-transitory media, or transport media. In one example, non-transitory media can include computer readable hardware media. Specific examples of computer readable hardware media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Computer-readable transport media can include carrier waves, or the like. Of course, those skilled in the art will recognize many modifications can be made to this configuration without departing from the scope or spirit of the disclosed subject matter.

What has been described above includes examples of the subject innovation. It is, of course, not possible to describe every conceivable combination of components or methodologies for purposes of describing the subject innovation, but one of ordinary skill in the art can recognize that many further combinations and permutations of the subject innovation are possible. Accordingly, the disclosed subject matter is intended to embrace all such alterations, modifications and variations that fall within the spirit and scope of the disclosure. Furthermore, to the extent that a term "includes", "including", "has" or "having" and variants thereof is used in either the detailed description or the claims, such term is intended to be inclusive in a manner similar to the term "comprising" as "comprising" is interpreted when employed as a transitional word in a claim.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Additionally, some portions of the detailed description have been presented in terms of algorithms or process operations on data bits within electronic memory. These process descriptions or representations are mechanisms employed by those cognizant in the art to effectively convey the substance of their work to others equally skilled. A process is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise or apparent from the foregoing discussion, it is appreciated that throughout the disclosed subject matter, discussions utilizing terms such as processing, computing, calculating, determining, or displaying, and the like, refer to the action and processes of processing systems, and/or similar consumer or industrial electronic devices or machines, that manipulate or transform data represented as physical (electrical and/or electronic)

quantities within the registers or memories of the electronic device(s), into other data similarly represented as physical quantities within the machine and/or computer system memories or registers or other such information storage, transmission and/or display devices.

In regard to the various functions performed by the above described components, architectures, circuits, processes and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In addition, while a particular feature may have been disclosed with respect to only one of several implementations, such feature may be combined with one or more other features of the other implementations as may be desired and advantageous for any given or particular application. It will also be recognized that the embodiments include a system as well as a computer-readable medium having computer-executable instructions for performing the acts and/or events of the various processes.

What is claimed is:

1. A system, comprising:
   a first stage data path multiplexer circuit comprising a first inverter circuit configured to select a first data signal from a set of data signals and a second inverter circuit configured to select a second data signal from the set of data signals, wherein
      the first inverter circuit comprises a first set of inverters and a first set of transmission gates,
      the second inverter circuit comprises a second set of inverters and a second set of transmission gates,
      the first set of transmission gates comprises at least two first transmission gates having different sizes, and
      the second set of transmission gates comprises a least two second transmission gates having different sizes; and
   a second stage data path multiplexer circuit configured as a third inverter circuit that selects the first data signal or the second data signal as an output data signal, wherein the third inverter circuit comprises a third set of inverters and a third set of transmission gates.

2. The system of claim 1, wherein the first set of transmission gates is electrically coupled to the first set of inverters and a first inverter from the third set of inverters, and wherein the second set of transmission gates is electrically coupled to the second set of inverters and a second inverter from the third set of inverters.

3. The system of claim 1, wherein a first inverter from the third set of inverters is configured to receive the first data signal and a second inverter from the third set of inverters is configured to receive the second data signal.

4. The system of claim 1, wherein the first set of transmission gates and the second set of transmission gates are controlled by a first clock signal and the third set of transmission gates is controlled by a second clock signal.

5. The system of claim 1, wherein a number of inverters included in the first set of inverters and the second set of inverters correspond to a number of data signals included in the set of data signals.

6. The system of claim 1, wherein a number of transmission gates included in the first set of transmission gates and the second set of transmission gates correspond to a number of data signals included in the set of data signals.

7. The system of claim 1, wherein the second stage data path multiplexer circuit comprises an amplifier that is configured to output the output data signal.

8. The system of claim 7, wherein the third set of transmission gates is electrically coupled to the third set of inverters and the amplifier.

9. The system of claim 1, wherein the first stage data path multiplexer circuit and the second stage data path multiplexer circuit correspond to a 4:1 multiplexer.

10. The system of claim 1, wherein the first stage data path multiplexer circuit is configured to receive the set of data signals from an 8:4 multiplexer.

11. The system of claim 10, wherein the 8:4 multiplexer generates the set of data signals based on a set of latches configured to reduce a frequency of the set of data signals.

12. A method, comprising:
   selecting a first data signal from a set of data signals via a first inverter circuit that comprises a first set of inverters and a first set of transmission gates, wherein the first set of transmission gates comprise at least two first transmission gates having different sizes;
   selecting a second data signal from the set of data signals via a second inverter circuit that comprises a second set of inverters and a second set of transmission gates, wherein the second set of transmission gates comprise at least two second transmission gates having different sizes; and
   selecting the first data signal or the second data signal as an output data signal via a third inverter circuit that comprises a third set of inverters and a third set of transmission gates.

13. The method of claim 12, further comprising:
   controlling the first set of transmission gates and the second set of transmission gates via a first clock signal; and
   controlling the third set of transmission gates via a second clock signal.

14. The method of claim 12, further comprising:
   transmitting the first data signal to a first inverter from the third set of inverters; and
   transmitting the second data signal to a second inverter from the third set of inverters.

15. The method of claim 12, further comprising:
   amplifying the output data signal via an amplifier electrically coupled to the third set of transmission gates.

16. The method of claim 12, further comprising:
   receiving the set of data signals from a multiplexer circuit configured for data retiming.

17. A system, comprising:
   a first multiplexer configured to select a subset of data signals from a set of data signals; and
   a second multiplexer comprising:
      a first stage data path multiplexer circuit that comprises a first inverter circuit configured to select a first data signal from the subset of data signals and a second inverter circuit configured to select a second data signal from the subset of data signals, wherein
         the first inverter circuit comprises a first set of inverters and a first set of transmission gates,
         the second inverter circuit comprises a second set of inverters and a second set of transmission gates,
         the first set of transmission gates comprises at least two first transmission gates having different sizes, and
         the second set of transmission gates comprises a least two second transmission gates having different sizes; and a second stage data path multiplexer circuit that comprises a third inverter circuit configured to select the first data signal or the second data signal as an output data signal, wherein the third inverter circuit comprises a third set of inverters and a third set of transmission gates.

18. The system of claim 17, wherein the first set of transmission gates is electrically coupled to the first set of inverters and a first inverter of the third set of inverters, and wherein the second set of transmission gates is electrically coupled to the second set of inverters and a second inverter of the third set of inverters.

19. The system of claim 17, wherein a first inverter of the third set of inverters is configured to receive the first data signal and a second inverter of the third set of inverters is configured to receive the second data signal.

20. The system of claim 17, wherein the first set of transmission gates and the second set of transmission gates are controlled by a first clock signal and the third set of transmission gates is controlled by a second clock signal.

* * * * *